(12) United States Patent
Mazzagatti et al.

(10) Patent No.: US 7,676,477 B1
(45) Date of Patent: Mar. 9, 2010

(54) UTILITIES FOR DERIVING VALUES AND INFORMATION FROM WITHIN AN INTERLOCKING TREES DATA STORE

(75) Inventors: Jane Campbell Mazzagatti, Blue Bell, PA (US); Jane Van Keuren Claar, Bethlehem, PA (US)

(73) Assignee: Unisys Corporation, Blue Bell, PA (US)

( * ) Notice: Subject to any disclaimer, the term of this patent is extended or adjusted under 35 U.S.C. 154(b) by 95 days.

(21) Appl. No.: 11/258,293

(22) Filed: Oct. 24, 2005

(51) Int. Cl.
*G06F 7/00* (2006.01)
*G06F 17/00* (2006.01)

(52) U.S. Cl. .......................................... 707/100; 707/1
(58) Field of Classification Search .................... 707/2, 707/1
See application file for complete search history.

(56) References Cited

U.S. PATENT DOCUMENTS

| | | | |
|---|---|---|---|
| 4,286,330 A | 8/1981 | Isaacson | |
| 5,245,337 A | 9/1993 | Bugajski | |
| 5,293,164 A | 3/1994 | Bugajski | |
| 5,592,667 A | 1/1997 | Bugajski | |
| 5,630,125 A | 5/1997 | Zellweger | |
| 5,829,004 A | 10/1998 | Au | |
| 5,963,965 A | 10/1999 | Vogel | |
| 5,966,709 A | 10/1999 | Zhang | |
| 5,978,794 A | 11/1999 | Agrawal et al. | |
| 5,983,232 A | 11/1999 | Zhang | |
| 6,018,734 A | 1/2000 | Zhang | |
| 6,029,170 A | 2/2000 | Garger | |
| 6,031,993 A | 2/2000 | Andrews et al. | |
| 6,102,958 A | 8/2000 | Meystel | |

(Continued)

FOREIGN PATENT DOCUMENTS

| | | |
|---|---|---|
| EP | 0 079 465 | 1/1985 |
| WO | WO 95/17783 | 6/1995 |
| WO | WO 99/34307 | 7/1999 |
| WO | WO 01/46834 | 6/2001 |
| WO | WO 02/063498 | 8/2002 |

OTHER PUBLICATIONS

"Graph Coloring", http://web.archive.org/web/20040811125752/http://www.personal.kent.edu/~rmuhamma/GraphTheory/MyGraphTheory/coloring.htm, Aug. 11, 2004, 9 pp.*

(Continued)

*Primary Examiner*—James Trujillo
*Assistant Examiner*—Marc Somers
(74) *Attorney, Agent, or Firm*—Richard J. Gregson; Robert P. Marley (57) ABSTRACT

A method for accessing a KStore including at least one K path having at least one subcomponent node and at least one root node includes providing a utility routine and accessing the KStore using the utility routine. The accessing may include traversing the at least one K path. The at least one K path includes a further node and bidirectional links between the at least one subcomponent node and the further node. The method includes traversing between the at least one subcomponent node and the further node by way of the bidirectional links. The further node can be a beginning of thought node, an end of thought node, root node, or a subcomponent node. A location may be determined within the KStore. The K Store may be queried. Searches for information within the KStore may be performed. The KStore may be traversed to constrain and focus the KStore. The KStore may be updated.

24 Claims, 5 Drawing Sheets

U.S. PATENT DOCUMENTS

| | | | |
|---|---|---|---|
| 6,115,715 | A | 9/2000 | Traversat et al. |
| 6,138,115 | A | 10/2000 | Agrawal et al. |
| 6,138,117 | A | 10/2000 | Bayardo |
| 6,160,549 | A | 12/2000 | Touma et al. |
| 6,275,817 | B1 | 8/2001 | Reed et al. |
| 6,278,987 | B1 | 8/2001 | Reed et al. |
| 6,286,002 | B1 | 9/2001 | Axaopoulos et al. |
| 6,341,281 | B1 | 1/2002 | MacNicol et al. |
| 6,360,224 | B1 | 3/2002 | Chickering |
| 6,381,600 | B1 | 4/2002 | Lau |
| 6,389,406 | B1 | 5/2002 | Reed et al. |
| 6,394,263 | B1 | 5/2002 | McCrory |
| 6,453,314 | B1 | 9/2002 | Chan et al. |
| 6,470,277 | B1 | 10/2002 | Chin et al. |
| 6,473,757 | B1 | 10/2002 | Garofalakis et al. |
| 6,499,026 | B1 | 12/2002 | Rivette et al. |
| 6,505,184 | B1 | 1/2003 | Reed et al. |
| 6,581,063 | B1 | 6/2003 | Kirkman |
| 6,604,114 | B1 | 8/2003 | Toong et al. |
| 6,615,202 | B1 | 9/2003 | Ding et al. |
| 6,624,762 | B1 | 9/2003 | End, III |
| 6,662,185 | B1 | 12/2003 | Stark et al. |
| 6,681,225 | B1 | 1/2004 | Uceda-Sosa et al. |
| 6,684,207 | B1 | 1/2004 | Greenfield et al. |
| 6,691,109 | B2 | 2/2004 | Bjornson et al. |
| 6,745,194 | B2 | 6/2004 | Burrows |
| 6,748,378 | B1 | 6/2004 | Lavender et al. |
| 6,760,720 | B1 | 7/2004 | De Bellis |
| 6,769,124 | B1 | 7/2004 | Schoening et al. |
| 6,804,688 | B2 | 10/2004 | Kobayashi et al. |
| 6,807,541 | B2 | 10/2004 | Bender et al. |
| 6,816,856 | B2 | 11/2004 | Baskins et al. |
| 6,826,556 | B1 | 11/2004 | Miller et al. |
| 6,831,668 | B2 | 12/2004 | Cras et al. |
| 6,868,414 | B2 | 3/2005 | Khanna et al. |
| 6,900,807 | B1 | 5/2005 | Liongosari et al. |
| 6,931,401 | B2 | 8/2005 | Gibson et al. |
| 6,952,736 | B1 | 10/2005 | Westbrook |
| 6,965,892 | B1 | 11/2005 | Uceda-Sosa et al. |
| 7,130,859 | B2 * | 10/2006 | Kobayashi .................. 707/102 |
| 2001/0010048 | A1 * | 7/2001 | Kobayashi ..................... 707/2 |
| 2002/0124003 | A1 | 9/2002 | Rajasekaran et al. |
| 2002/0138353 | A1 | 9/2002 | Schreiber et al. |
| 2002/0188613 | A1 | 12/2002 | Chakraborty et al. |
| 2002/0194173 | A1 | 12/2002 | Bjornson et al. |
| 2003/0033279 | A1 | 2/2003 | Gibson et al. |
| 2003/0093424 | A1 | 5/2003 | Chun et al. |
| 2003/0115176 | A1 | 6/2003 | Bobroff et al. |
| 2003/0120651 | A1 | 6/2003 | Bernstein |
| 2003/0204513 | A1 | 10/2003 | Bumbulis |
| 2003/0204515 | A1 | 10/2003 | Shadmon et al. |
| 2004/0107186 | A1 | 6/2004 | Najork et al. |
| 2004/0133590 | A1 | 7/2004 | Henderson et al. |
| 2004/0143571 | A1 | 7/2004 | Bjornson et al. |
| 2004/0230560 | A1 | 11/2004 | Elza et al. |
| 2004/0249781 | A1 | 12/2004 | Anderson |
| 2005/0015383 | A1 | 1/2005 | Harjanto |
| 2005/0050054 | A1 | 3/2005 | Clark et al. |
| 2005/0071370 | A1 | 3/2005 | Atschul et al. |
| 2005/0080800 | A1 | 4/2005 | Parupudi et al. |
| 2005/0097108 | A1 | 5/2005 | Wang et al. |
| 2005/0102294 | A1 | 5/2005 | Coldewey |
| 2005/0149503 | A1 | 7/2005 | Raghavachari |
| 2005/0171960 | A1 | 8/2005 | Lomet |
| 2005/0262108 | A1 | 11/2005 | Gupta |

OTHER PUBLICATIONS

Burton F. W. et al: "Multiple Generation Text Files Using Overlaping Tree Structures", Computer Journal, Oxford University Press, Surrey, GB, vol. 28, No. 4, Aug. 1985, pp. 414-416.

Gschia-Yuan Teng & David L. Neuhoff, "An Improved Hierarchical Lossless Text Compression Algritm", Proceedings 1995 Data Compression Conference.

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

* cited by examiner

Figure 4 Nodes Including Count Field

Figure 5

UTILITIES FOR DERIVING VALUES AND INFORMATION FROM WITHIN AN INTERLOCKING TREES DATA STORE

BACKGROUND OF THE INVENTION

1. Field of Invention

This invention relates to computing and in particular to the field of data structures such as interlocking trees datastores.

2. Description of Related Art

Practically, in the field of computer programming, utilities are programs that perform very specific tasks, usually related to managing system resources, but may perform other practical functions as well. Within the realm of traditional relational databases, utilities used to query tables within databases in order to retrieve, update, or track data are fairly common in the art. For example, U.S. Pat. No. 6,643,649, entitled "Utility for cross platform database query" teaches a utility for cross platform database query, where the utility resides at an object server in a data system. The utility obtains a set of data items from a library server in the data system; places the set of data items from the library server in a temporary table at the object server; obtains each data item from the temporary table and the base object table; and converts each data item from the temporary table and the base object table, if a conversion is required, such that each data item from the temporary table and the base object table may be compared.

Specifically, in terms of retrieving data from within a database, U.S. Pat. No. 5,129,082, entitled "Method and apparatus for searching database component files to retrieve information from modified files" teaches a method where each database component file contains information regarding the text contained in the source file which enables the user to quickly determine the frequency of occurrence of the specified text and the location of the specified text in the source file.

Updating data in traditional relational databases is addressed in U.S. Pat. No. 6,564,215, entitled "Update support in database content management." This patent teaches a method for updating data objects that are maintained in data storage external to a database management system (DBMS). Also, U.S. Pat. No. 4,648,036, entitled "Method for controlling query and update processing in a database system" teaches a method of performing update transactions in a database system to preserve consistent logical data states at all times.

Determining locations within databases is another function of utilities. For example, U.S. Pat. No. 6,697,797, entitled, "Method and apparatus for tracking data in a database, employing last-known location registers" teaches a data tracking scheme that employs a "last-known location" register as a part of a data block's ID.

While producing satisfactory results in traditional relational databases, the methods cited above do not apply to KStore technology.

All references cited herein are incorporated herein by reference in their entireties.

BRIEF SUMMARY OF THE INVENTION

A method for accessing or updating a KStore (also referred to herein as a K Store or just K) including at least one K path having at least one subcomponent node and at least one root node includes providing at least one utility routine and accessing the KStore using the at least one utility routine. The accessing may include traversing the at least one K path. The at least one K path includes a further node and bidirectional links between the at least one node and the further node. The method includes traversing between the at least one node and the further node by way of the bidirectional links. The further node can be a beginning of thought node (BOT), an end of thought node (EOT), root node or a subcomponent node A location may be determined within the KStore. The K Store is queried. Searches for information within the KStore may be performed. The KStore may be traversed to constrain and focus the KStore. The K Store may be updated.

The KStore technology addresses the problems associated with traditional relational databases. As described in copending U.S. patent application Ser. Nos. 10/385,421 filed Mar. 3, 2003 and entitled "System and method for storing and accessing data in an interlocking tress datastore" (published as US Patent Application Publication No. 20040181547 A1 Sep. 16, 2004 and for which U.S. Pat. No. 6,961,733 was granted Nov. 1, 2005) and copending Ser. No. 10/666,382, filed Sep. 19, 2003 and entitled "System and method for storing and accessing data in an interlocking trees datastore" (published as US Patent Application Publication No. 20050076011 A1 Apr. 7, 2005 and for which U.S. Pat. No. 7,158,975 was granted Jan. 2, 2007) both by Mazzagatti the KStore structure eliminates the distinction between transactional data and stored (relational) data.

With the development of the KStore technology, there is a need for utilities to access the unique interlocking trees datastore and provide information from within the K to other internal procedures for use in handling requests from external applications, data sources, and GUIs.

We have developed a system and various methods for creating and accessing interlocking trees datastores and various features of said interlocking trees datastores. We refer to an instantiation of these interlocking trees datastores that we have developed as a "KStore" or just "K". In particular these structures and methods have been described in U.S. patent application Ser. Nos. 10/385,421, (published as US Patent Application Publication No. 20040181547. A1 Sep. 16, 2004 and for which U.S. Pat. No. 6,961,733 was granted Nov. 1, 2005) and Ser. No. 10/666,382 (published as US Patent Application Publication No. 20050076011. A1 Apr. 7, 2005 and for which U.S. Pat. No. 7,158,975 was granted Jan. 2, 2007). Additionally, we described a system in which such interlocking datastores could more effectively be used in unpublished U.S. patent application Ser. Nos. 10/879,329 filed on Jun. 29, 2005 and entitled "Functional operations for accessing and/or building interlocking trees datastores to enable their use with applications software." While the system and method we describe in this patent relate with particularity to the specific interlocking trees datastores which inventor Mazzagatti hereof described in the above-referenced patent (applications), it should be readily apparent that the system and methods described herein may also be applicable to similar structures.

The invention described herein below related to interlocking trees datastores, a structure described in prior patent applications and can be readily used by and adapted to devices described in patent applications U.S. patent application Ser. No. 10/759,466 filed on Jun. 16, 2004 and entitled "Saving and restoring an interlocking trees datastore" (now published as US Patent Application Publication No. 20050165749 A1) which is for use with such interlocking trees datastores.

As explained in the above mentioned patent documents, a KStore structure can be built within the memory of a computer system or computer systems. Depending on the amount of data loaded into K, the KStore structure and the amount of computer memory used can be quite large. As well, the more nodes there are in the data structure, the more nodes will be searched during a query of the data. The more nodes searched, the more time it takes to provide an answer to the query.

The invention described herein overcomes the inherent limitations associated with the prior art by providing a series of KStore utilities, which are a group of programming routines or procedures (or potentially hardware or some other as yet unidentified medium), that are called and used repeatedly within KStore to access, update, traverse, and search the structure, resulting in the return of information from the structure to other routines for processing if required.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

As taught in unpublished U.S. patent application Ser. No. 10/879,329, we have integrated KStore components into a system that is facile at handling data for nearly any desired use. While the above mentioned patent taught how the components of the KStore system integrate, in order to understand the topic of this current invention, a brief summary of the KStore system is presented below.

Figure 1:
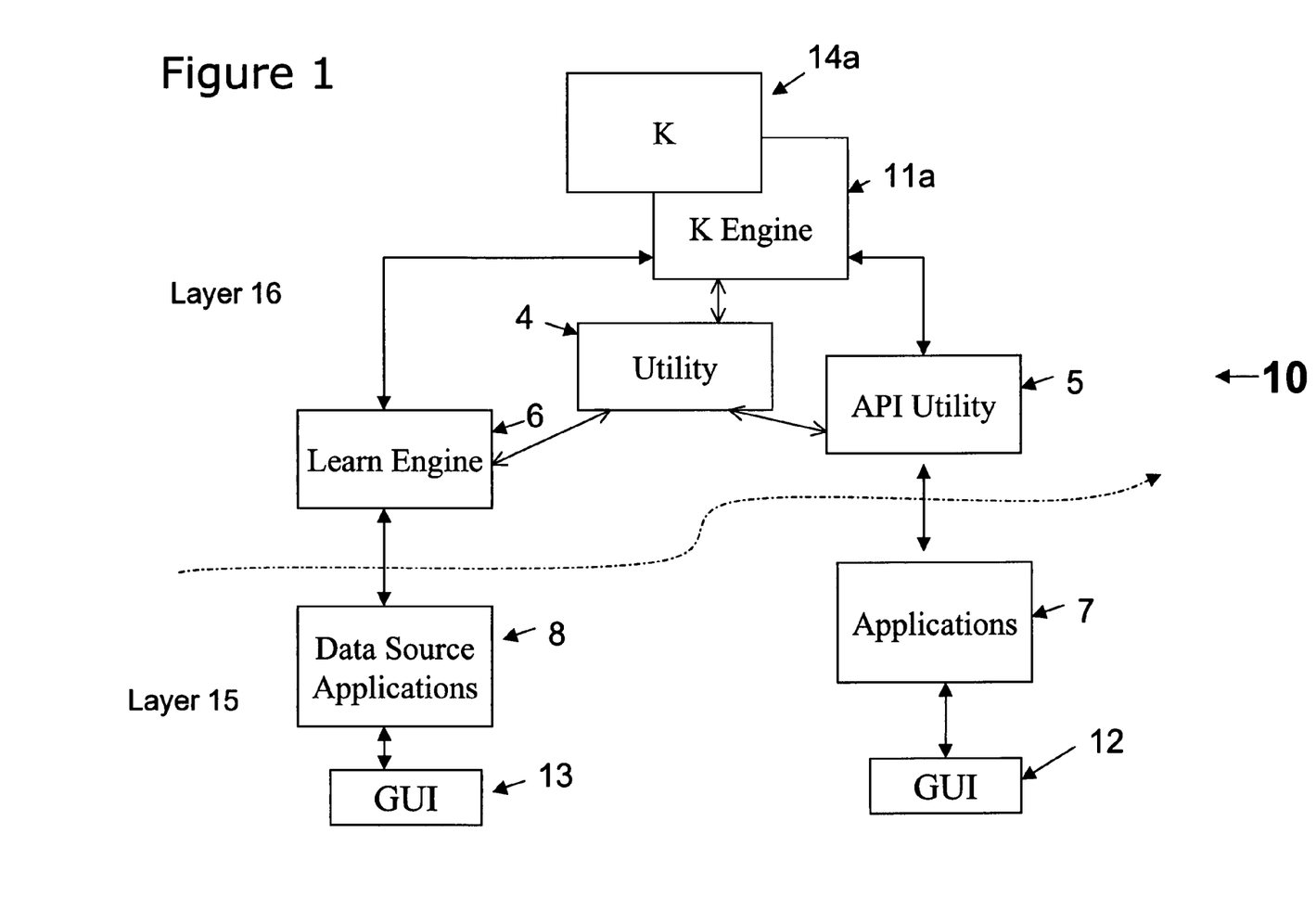
FIG. 1 shows a block diagram representation illustrating the interaction of the main components used in preferred embodiments of this invention.

In a preferred embodiment, data coming into KStore can be learned, formed into an interlocking tree structure (K), and read into computer memory. Refer to FIG. 1. FIG. 1 shows a block diagram representation illustrating the interaction of the main components that can be used in preferred embodiments of this invention. Generally, the KStore interlocking trees datastore 14a can be built into a relatively fixed structure within the memory of a computer system or computer systems, although a memory of a computer system is not necessary. The K can be built using a resource called a K Engine 11a, which has a set of rules it applies to data that can be particalized for it and sent to it, in order to support the K Engine 11a task of recording the particalized data as events in the KStore. The KStore 14a itself can be accessed to answer queries about the data, preferably using resources such as the API Utility 5 either directly or by way of the Utility 4. The API utility 5 can be accessed by a user by way of the GUI 12 and the applications 7 of Layer 15. A user can also use the GUI 13 and the data source applications 8 of Layer 15 in order to use the learn engine 6 with the KEngine 11a and the K 14a directly or by way of the Utility 4. These procedures are described in more detail in the above referenced patent documents.

Additionally, the KEngine 11a can provide output according to the information received from the KStore 14a. The output can be displayed on a graphical display device (not shown). Furthermore, input can be received and information can be determined by the KEngine 11a simultaneously with the building or testing of the KStore 14a. For example the KStore 14a can be built from a data source 8. Any number of threads can be streamed simultaneously from the data source 8 to the KStore 14a by way of a learn engine 6 within the KStore system 10. Additionally, the data source 8 can be another KStore 14a, a data repository storing data records from a dataset or another KStore or any other source of record sets suitable for storage in the KStore 14a. In a preferred embodiment of the invention input from the application program interface/utility 5 and the learn engine 6 can be received by the utility 4. The utility 4 can include any routines useful for performing tasks within the KStore 14a such as routines for receiving particles and traversing the interlocking trees datastore within the KStore 14a.

In addition to the set of routines to access the KStore structure and return information for processing taught in U.S. patent application Ser. No. 10/666,382 (published as US Patent Application Publication No. 20050076011 A1 Apr. 7, 2005 and for which U.S. Pat. No. 7,158,975 was granted Jan. 2, 2007) many other utility routines that derive values and other information from within an interlocking trees datastore can be developed and programmed by those skilled in the alt. U.S. patent application Ser. No. 11/258,292 filed on Oct. 24, 2005 entitled "API to KStore interlocking trees datastore" which is owned by the Assignee of the instant application teaches the application programming interface (API) which includes the API Utility 5 and the Learn Engine 6. API 5 enables user programmers to develop and execute multiple application programs without having to understand the processes required to traverse and return address locations within a KStore interlocking trees datastore. The present invention includes the utility routines 4 that are not visible to end users. The present invention also includes utilities that are located anywhere in the KStore system 10 whether they are visible to end users or not, if they are used to access and derive K values or information from the KStore structure or perform other tasks upon the information in the KStore 14a. In a preferred embodiment, however, utilities that are visible to end users never permit node locations or addresses or K location pointers out of level (or layer) 16. The utility tasks of the present invention can include, for example, querying, accessing, traversing, searching or other tasks required for managing KStore resources.

In the field of computer programming, a "utility" is a program that performs a specific task, for example, a task related to managing system resources. Operating systems contain a number of utilities for managing disk drives, printers, and other devices. Utilities differ from applications mostly in terms of size, complexity and function. For example, word processors, spreadsheet programs, and database applications are considered applications because they are large programs that perform a variety of functions not directly related to managing computer resources. In the current embodiment, KStore utilities are a group of programming routines or procedures (or potentially hardware or some other as yet unidentified medium) that are called and used repeatedly when the KStore structure is accessed, updated, traversed and searched, resulting in the return of information from the structure to other routines for processing if required. We have chosen to differentiate between those utilities visible to end users, such as API utilities, and those not visible to the end user, such as the utilities described within this patent.

In the current embodiment we identify sets of utilities that perform different functions. It should be noted that these do not make up the complete set of potential utilities that will be integrated within KStore. Those skilled in the art will recognize that many other utilities can be programmed and integrated into the space identified in KStore system 10 as Utility 4.

Utility Sets

As mentioned above, within the current embodiment there are sets (groups) of utilities. The main function that ties all of these utilities together is that they can all work to access a KStore datastore, in order to derive values and information from within the structure, and return information to other routines. The following are examples of utilities:

Retrieve information from K
Update K structure
Determine K locations

Each of these groups contains one or more utilities that function to perform a specific task. In the following discussion, we will define what each group of utilities does.

Retrieve Information from K

The utilities in this group retrieve information from a K structure. This may be accomplished by traversing a KStore structure, finding values or returning information to other system components and applications which may in turn supply the information to users. The utilities within this group can be further subdivided into at least the following sub-groupings according to the functions they accomplish: retrieve particle values and retrieve structure information.

The retrieve particle values sub group contains procedures to obtain values or particle sequences from within a KStore interlocking trees datastore. These procedures may retrieve particle values from single nodes. In the preferred embodiment, these single nodes are the elemental root nodes of a K structure.

There are also procedures within this sub group that may return values for entire paths or from between sets of nodes on any level of a K by traversing the structure and returning the associated particle sequences. The structure may be traversed in any manner that is convenient to obtain the particle values.

Figure 2:
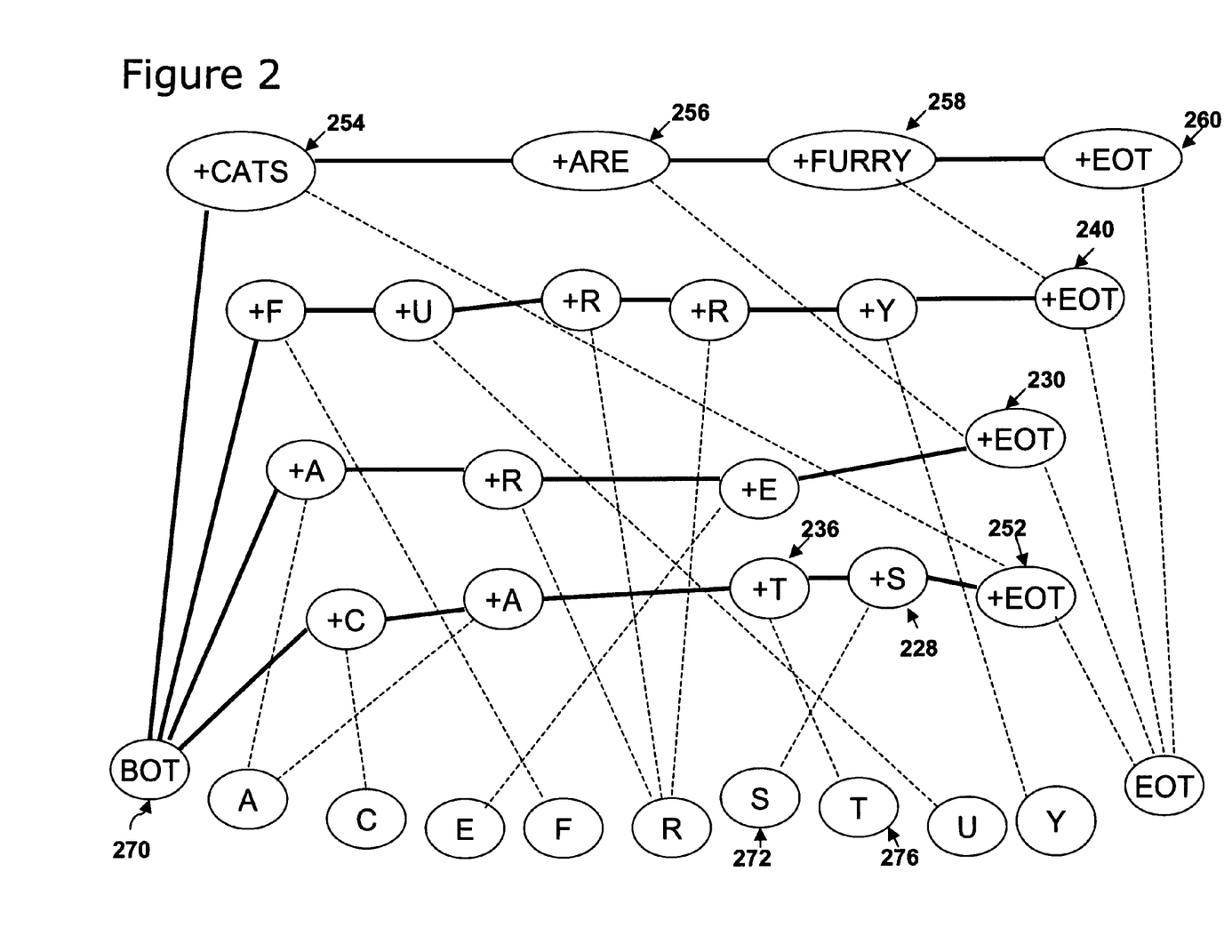
FIG. 2 shows a graphical representation of interlocking trees datastore.

An example of a procedure in this sub group is one that reconstructs a set of particle data that was previously inputted into K and learned. For example, this procedure can obtain the value or particle sequence for end product node 252. Refer to FIG. 2. From end product node 252 the procedure can traverse the Case path toward the BOT node 270 to subcomponent node 228. The traversal can be performed by following the pointers of the bidirectional links between the nodes. The procedure can then obtain the particle value "S" from the elemental root node "S" 272 through the Result path connection of the subcomponent node 228. The particle value, which in this case is "S", can be written to a string buffer in memory.

Next the procedure can proceed toward the next node along the path to subcomponent node 236. As with the subcomponent node 228, the procedure can determine the particle value of the elemental root node associated through the Result path of the subcomponent node 236. In this case the particle value is "T" from the elemental node 276. The procedure can write this value to a string buffer in memory as it did with the first node. This process can be continued at each node in the path between the end product node 252 and the BOT node 270, writing each value to the string buffer. In this way, input can be reconstructed by traversing the Case path, finding all of the values or particles of data for the path, and writing them to string buffer memory. The particle sequence or values in the string buffer can then be presented to the user, used in a calculation, or any other process or procedure commonly used in computer operations.

Figure 3:
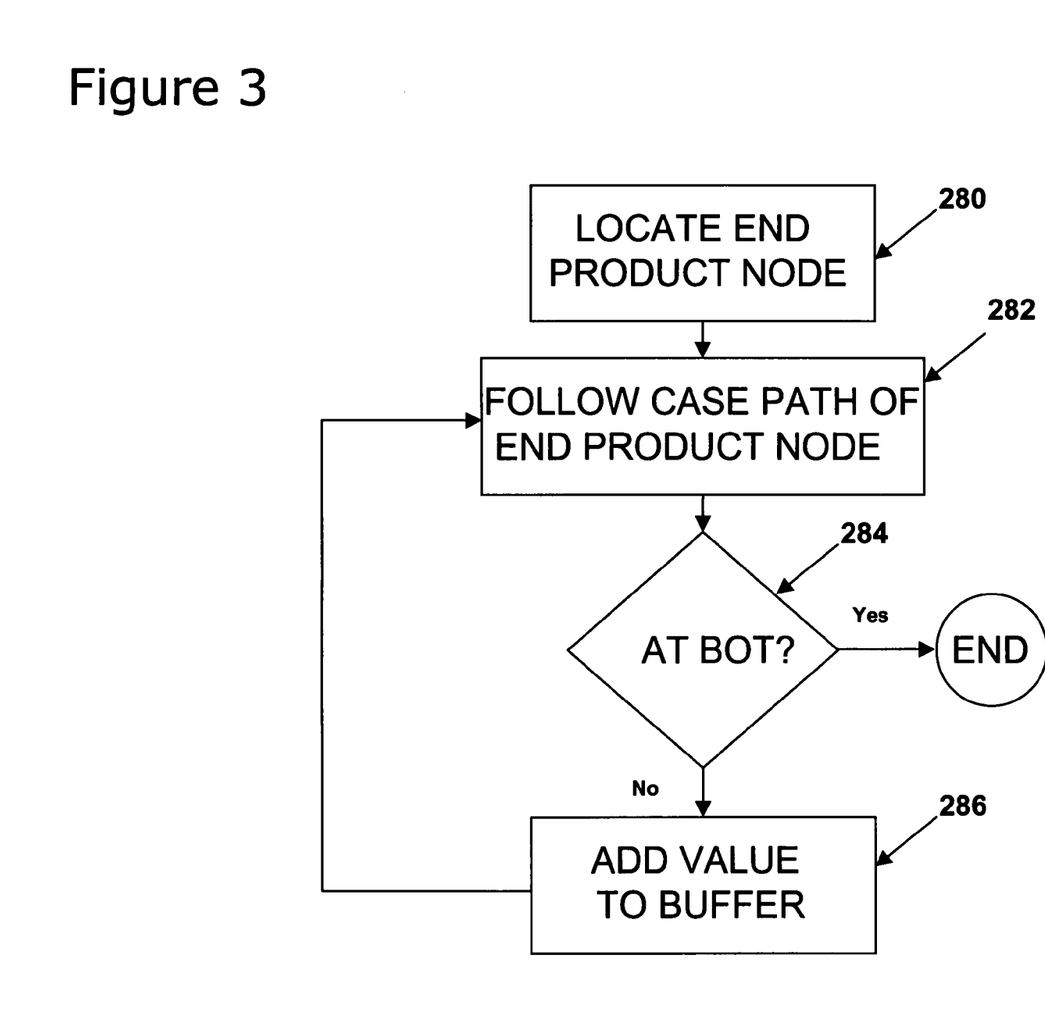
FIG. 3 shows a flowchart of the logic of a procedure reconstructing a set of particle data.

The logic of this procedure is shown in FIG. 3. An end product node such as the end product node 252 is found as shown in block 280. The procedure can traverse the Case path from the located end product node to reconstruct the particle values as shown in block 282. If a node located during the traversal is not the BOT node as determined in decision 284, the value can be added to the string buffer as shown in block 286. If the node is the BOT node the procedure ends.

This procedure can be used to reconstruct multiple input sequences by starting at a higher level in K and traversing from higher to lower end product nodes using the Result bidirectional pointers. For example, to reconstruct a multiple input sequence in the KStore of FIG. 2 a traversal from the end product node 260 toward the BOT node 270 can be performed. The subcomponent nodes 258, 256 and 254 can be traversed to reconstruct the particle sequence "CATS ARE FURRY." The procedure traverses from the subcomponent nodes 258, 256 and 254 to the end product nodes 240, 230 and 252, respectively. The process can be continued from each end product node 240, 230 and 252 toward the BOT node 270 until all values or particle sequences are reconstructed. It should be noted that because the nodes are traversed from the end product node toward the BOT node 270, letters or words are written to the string buffer in reverse order.

Note that particle values may be any digitized data. Digitized data may be returned as sound, pixels, or other like values.

The retrieve structure information sub group can find and return specific information about the interlocking trees structure. This may include but is not limited to, the number of nodes in a specific asCase list or asResult list, the location of nodes in relation to other nodes or information from additional fields that may be contained within the nodes. One of the procedures can return the value in the count field of each root node for the field values associated with a specific column within a K. For example, assume that for the field "salesperson" in an exemplary data set, there are two values "Bill" and "Tom." The procedure can determine the count or the number of times each of these values has been recorded within the structure.

Update the Structure

The utilities in this group can update individual nodes (which may include fields, information, or counts) or sets of nodes in a K structure. The utilities within this group are subdivided, in the current embodiment, into at least the following sub-groupings according to the functions they accomplish: updating K by adding, removing, and modifying nodes and update fields within nodes.

Update K

The update K sub group can provide a method to add, change, remove, or rearrange nodes within an existing structure. Another example procedure in this sub group adds new nodes to the end of a path. A preferred method to update K is taught in U.S. patent application Ser. No. 11/258,296 filed on Oct. 24, 2005 and published as 20070162508 on Jul. 12, 2007 entitled "Updating Information in an Interlocking Trees Data Store" which is owned by the Assignee of the instant application.

Update Fields within Nodes

Fields can be changed in any way, for example by changing the values of fields, changing Case, Result, asCase, and asResult pointers. As well, additional fields within nodes can be updated and changed.

Figure 4:
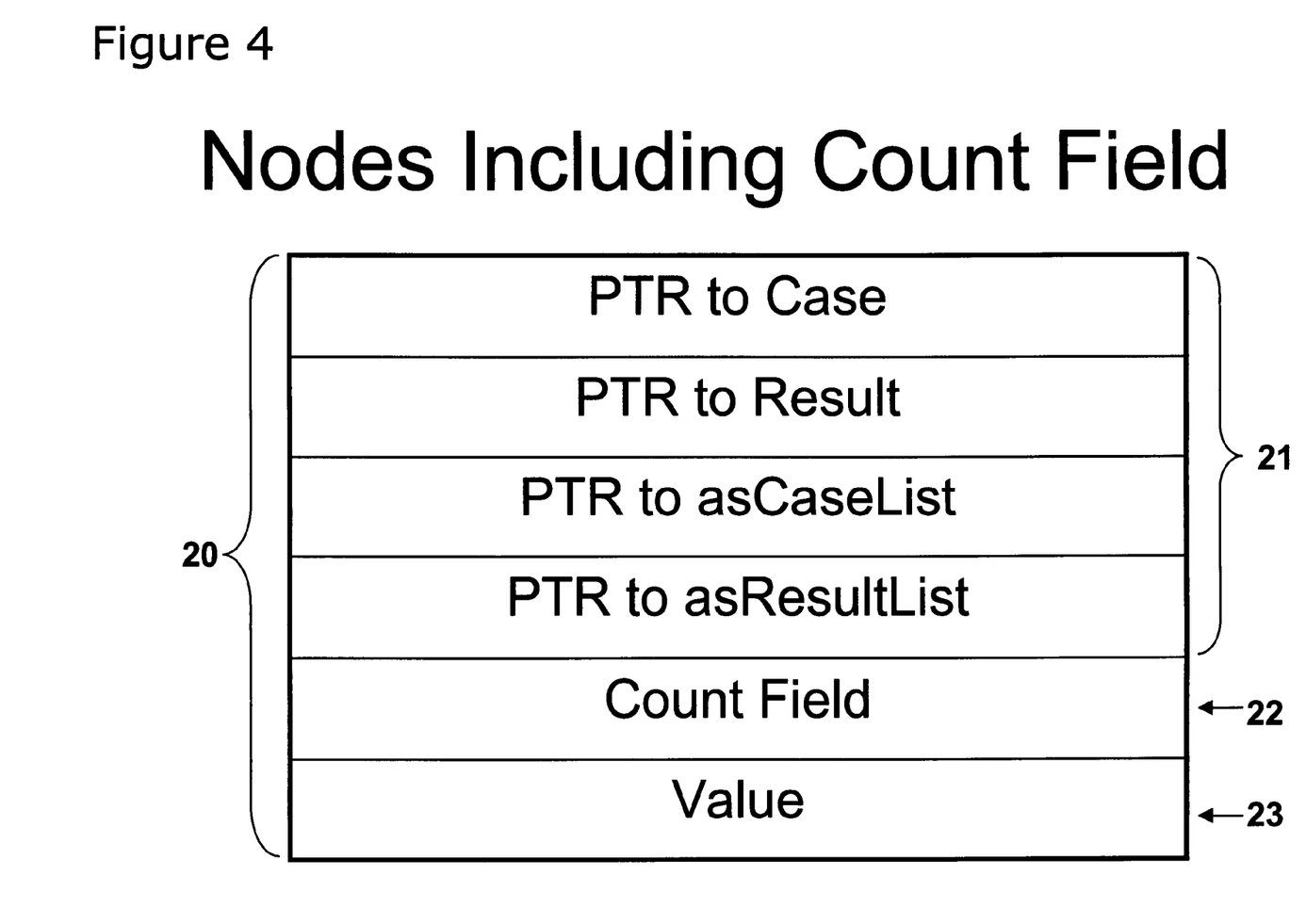
FIG. 4 is an exemplary node within K containing a count as an additional field.

To understand some of the importance of updating fields within nodes, one must understand that all nodes of an interlocking trees data store may also include additional fields representing information associated with said nodes. As taught in U.S. patent application Ser. No. 10/666,382, (published as US Patent Application Publication No. 20050076011 A1 Apr. 7, 2005 and for which U.S. Pat. No. 7,158,975 was granted Jan. 2, 2007), the nodes within an interlocking trees datastore may have additional fields. This may be illustrated using FIG. 4. The subcomponent and elemental root node fields are shown as fields in a block of fields for teaching purposes. An exemplary node 20 is shown in FIG. 4. A node may contain a value 23 (elemental root node) or a count field 22. The count field 22 may be initialized and incremented with an intensity variable, whose value can vary with conditions at times when the count field is being referenced. A simple example form of an intensity variable would be a single ordinal field value, such as '1' to be used to increment or decrement count fields to record the number of times that a node has been accessed or traversed. In the current embodiment, there are procedures to update and modify the numeric count within count fields 22. There can be many uses for additional fields and the nodes such as node 20 need not be limited to one additional field 23.

There are other procedures to update information in individual nodes and others to update fields in a node. For example, there are procedures to lock a node by setting a value in a lock field that can be provided within a node, and procedures to reorganize lists pointed to by pointers from within a node. A preferred method for locking a node is taught in U.S. patent application Ser. No. 11/185,620 filed on Jul. 20, 2005 and published as 20060101018 on May 11, 2006 entitled "Method for Processing New Sequence Being Recorded in an Interlocking Trees Datastore" which is owned by the Assignee of the instant application.

Those with knowledge of the KStore interlocking trees datastore structure will recognize that there are many potential reasons to update and modify fields in nodes. One example is taught in application Ser. No. 11/258,296 filed on Oct. 24, 2005 and published as 20070162508 on Jul. 12, 2007 entitled "Updating Information in an Interlocking Trees Data Store" which is owned by the Assignee of the instant application.

Determine K Locations

This group of utilities can traverse and determine locations in a KStore known as K locations pointers. Location pointers are discussed in U.S. patent application Ser. No. 11/100,830, (published as U.S. Patent Application Publication No. 20060074939 Apr. 1, 2007) and entitled "Facilitated reuse of k locations in a knowledge store."

The utilities within this group can be further subdivided according to the functions they accomplish into at least the following sub groupings: determine K locations from particle sequences and determine K locations from other nodes.

Determine K Locations from Particle Sequences

These utilities use particalized data and call the KEngine which returns locations in K. Routines in this sub-group are used in different ways to find nodes associated with a given particle sequence. One example utility is called masking to permit locating structure within a KStore. The masking utility may be used to determine a set of K paths in a KStore that satisfies an input sequence including a plurality of particles. This method can include receiving the input sequence by the KStore, processing the input sequence by the KStore and determining the set of K paths in accordance with the input sequence. The method can also include determining whether a selected particle of the plurality of particles is a mask. If the selected particle is a mask a mask type is determined and an initial set of K paths is determined in accordance with the mask type. Masking is taught in as yet unpublished U.S. Ser. No. 11/132,490 entitled "Variable masking" and filed on May 18, 2005.

Determine K Locations from Other Nodes

Given a node, these routines can find other nodes based on certain criteria. For example, one exemplary routine can search through a node's asCase list for a node with a specific Result pointer.

Another routine finds associated root or end product nodes at various levels in an interlocking trees structure which are associated with another node or set of nodes. Assume we have a root node for a field. We may then determine all record paths by end product nodes that contain pointers to that field.

Figure 5:
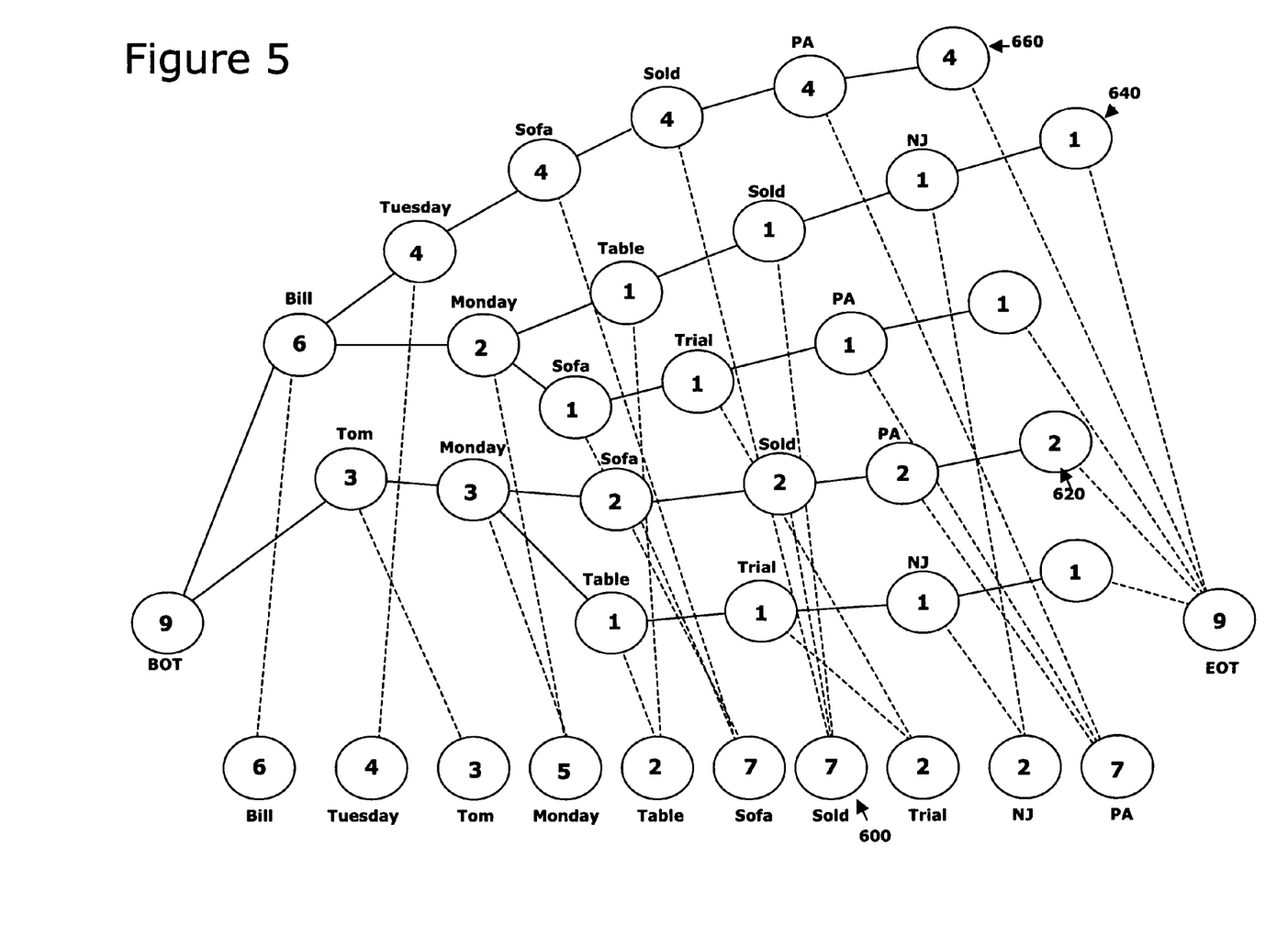
FIG. 5. shows a graphical representation of interlocking trees datastore with nodes constructed from fictional furniture store data used to illustrate other procedures to determine K locations.

Constraining utility groups determine K locations from particle sequences and determine K locations from other nodes. First, the node associated with the particle sequence for the constraint can be found. Then, using that root node, all paths or record end product nodes associated with the constraint root node may be found. For example, this routine could obtain the pointer location for the node for the variable "Sold." Using this node the list of all end product node paths that contain the variable "Sold" can be located in the asResult list as shown in FIG. 5 as the dotted lines leading from "Sold" node 600. The resulting list of end product nodes 620, 640, and 660 of each record that contains "Sold" may then be used to sum a sales value column to obtain a total sales value. Additionally, the set of "Sold" record end product nodes can be further reduced to the set of "Sold" end product nodes for a particular product "Sofa" by traversing the paths of each end product node and eliminating the paths that do not contain "Sofa."

The invention claimed is:

1. A method for accessing a KStore including at least one K path having at least one subcomponent node and at least one root node, comprising:

(a) providing a utility routine; and (b) accessing said KStore using said utility routine, said KStore comprising an interlocking trees datastore structure comprising elemental root nodes, subcomponent nodes and end product nodes using asCase and asResult bidirectional links between the elemental root nodes, subcomponent nodes and end product nodes for determining paths within the interlocking trees datastore structure, said interlocking trees datastore comprising a first tree depending from a first root node and including at least one of a plurality of branches, wherein each of the plurality of branches ends in an end product node comprising a leaf node, said interlocking trees datastore further comprising a second root of a second tree linked to each end product node, said interlocking trees datastore further comprising at least a third tree, wherein a root of the third tree comprises an elemental node representing a particle, the root of the third tree linked to at least one node in at least one branch of the first tree; and wherein a first Case node, said first Case node referencing a node in a Case path;

a first Result node, said first Result node referencing a node in a Result path; and a first subcomponent node wherein said first subcomponent node (i) represents a logical relationship between said first Case node and said first Result node in accordance with said data and (ii) is adapted to serve as a second Case node;

asCase link represents a link to the first of the two nodes from which a node is created; and asResult link represents a link to the second of the two nodes from which a node is created.

2. The method for accessing a KStore of claim 1, wherein said accessing further comprises traversing said at least one K path.

3. The method for accessing a KStore of claim 2, wherein said at least one K path includes a further node and bidirectional links between said at least one subcomponent node and said further node further comprising traversing between said at least one subcomponent node and said further node by way of said bidirectional links.

4. The method for accessing a KStore of claim 3, wherein said further node comprises a beginning of thought node, said beginning of thought node comprising a last node of the at least one K path traversed in a direction beginning with an end product node or a first node of the at least one K path traversed in a direction beginning with the beginning of thought node.

5. The method for accessing a KStore of claim 3, wherein said further node comprises an end of thought node, said end of thought node representing a complete particle sequence.

6. The method for accessing a KStore of claim 3, wherein said further node comprises a subcomponent node, said subcomponent node referencing a particle of a particle sequence.

7. The method for accessing a KStore of claim 1, wherein said further node comprises a root node, said root node referencing a particle value.

8. The method for accessing a KStore of claim 1, further comprising determining a location within said KStore.

9. The method for accessing a KStore of claim 1, further comprising querying said KStore.

10. The method for accessing a KStore of claim 9, further comprising searching for information within said KStore.

11. The method for accessing a KStore of claim 9, further comprising determining information about said KStore.

12. The method for accessing a KStore of claim 10, further comprising searching in accordance with a mask.

13. The method for accessing a KStore of claim 9, further comprising traversing said KStore to constrain said KStore.

14. The method for accessing a KStore of claim 1, wherein said utility routine retrieves a particle value from the at least one root node of the at least one K path, the at least one root node comprising an elemental root node.

15. The method for accessing a KStore of claim 1, wherein said utility routine returns a value for the at least one K path or for sets of nodes on a level of the KStore by traversing a structure of the KStore and returning particle sequences associated with the traversed structure.

16. The method for accessing a KStore of claim 1, further comprising updating said KStore.

17. A system for representing data, comprising:
at least one processor;
memory operatively coupled to said processor;
a KStore located within said memory, said KStore including at least one K path having at least one subcomponent node and at least one root node, said KStore comprising an interlocking trees datastore structure comprising elemental root nodes, subcomponent nodes and end product nodes using asCase and asResult bidirectional links between the elemental root nodes, subcomponent nodes and end product nodes for determining paths within the interlocking trees datastore structure, said interlocking trees datastore comprising a first tree depending from a first root node and including at least one of a plurality of branches, wherein each of the plurality of branches ends in an end product node comprising a leaf node, said interlocking trees datastore further comprising a second root of a second tree linked to each end product node, said interlocking trees datastore further comprising at least a third tree, wherein a root of the third tree comprises an elemental node representing a particle, the root of the third tree linked to at least one node in at least one branch of the first tree; and a utility routine operatively coupled to said KStore; and
a first Case node, said first Case node referencing a node in a Case path;
a first Result node, said first Result node referencing a node in a Result path; and
a first subcomponent node wherein said first subcomponent node (i) represents a logical relationship between said first Case node and said first Result node in accordance with said data and (ii) is adapted to serve as a second Case node;
wherein a asCase link represents a link to the first of the two nodes from which a node is created; and
an asResult link represents a link to the second of the two nodes from which a node is created.

18. The system for representing data of claim 17, further comprising an update utility.

19. The system for representing data of claim 17, further comprising a traversing utility.

20. The system for representing data of claim 17, further comprising a search utility.

21. The system for representing data of claim 20, further comprising a constraint.

22. The system for representing data of claim 17, said utility routine reconstructing input by traversing the at least one K path, finding a value associated with each node of the at least one K path and writing each value to memory.

23. The system for representing data of claim 17, further comprising a plurality of utility routines operatively coupled to said KStore.

24. A method for transmitting information in a KStore wherein said KStore is operably coupled to an application layer further comprising preventing internal KStore information from being transmitted from said KStore to said application layer, said KStore including at least one K path having at least one subcomponent node and at least one root node, said method comprising:
(a) providing a utility routine; and
(b) accessing said KStore using said utility routine, said KStore comprising an interlocking trees datastore structure comprising elemental root nodes, subcomponent nodes and end product nodes using asCase and asResult bidirectional links between the elemental root nodes, subcomponent nodes and end product nodes for determining paths within the interlocking trees datastore structure, said interlocking trees datastore comprising a first tree depending from a first root node and including at least one of a plurality of branches, wherein each of the plurality of branches ends in an end product node comprising a leaf node, said interlocking trees datastore further comprising a second root of a second tree linked to each end product node, said interlocking trees datastore further comprising at least a third tree, wherein a root of the third tree comprises an elemental node representing a particle, the root of the third tree linked to at least one node in at least one branch of the first tree; and
wherein a first Case node, said first Case node referencing a node in a Case path;
a first Result node, said first Result node referencing a node in a Result path; and a first subcomponent node wherein said first subcomponent node (i) represents a logical relationship between said first Case node and said first Result node in accordance with said data and (ii) is adapted to serve as a second Case node;
an asCase link represents a link to the first of the two nodes from which a node is created;
and an asResult link represents a link to the second of the two nodes from which a node is created.

* * * * *